(12) United States Patent
Sandercock et al.

(10) Patent No.: US 10,427,363 B2
(45) Date of Patent: Oct. 1, 2019

(54) WIND TURBINE BLADE HAVING A LIGHTNING PROTECTION SYSTEM AND METHOD OF MAKING THE SAME

(71) Applicant: Vestas Wind Systems A/S, Aarhus N (DK)

(72) Inventors: Stephen Sandercock, Ryde Hampshire (GB); Toby Collard, Cowes Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 1045 days.

(21) Appl. No.: 14/767,791

(22) PCT Filed: Feb. 13, 2013

(86) PCT No.: PCT/DK2013/050037
§ 371 (c)(1),
(2) Date: Aug. 13, 2015

(87) PCT Pub. No.: WO2014/124642
PCT Pub. Date: Aug. 21, 2014

(65) Prior Publication Data
US 2015/0377217 A1    Dec. 31, 2015

(51) Int. Cl.
*B29C 70/72* (2006.01)
*B29C 70/88* (2006.01)
(Continued)

(52) U.S. Cl.
CPC .............. *B29C 70/72* (2013.01); *B29C 70/48* (2013.01); *B29C 70/885* (2013.01);
(Continued)

(58) Field of Classification Search
CPC ....... B29C 70/48; B29C 70/72; B29C 70/885; B29D 99/0025; B29K 2309/08;
(Continued)

(56) References Cited

U.S. PATENT DOCUMENTS

2006/0280613 A1  12/2006  Hansen
2009/0196751 A1   8/2009  Jacobsen et al.
(Continued)

FOREIGN PATENT DOCUMENTS

JP    WO 2008155881 A1 * 12/2008    ........... H02B 13/005

OTHER PUBLICATIONS

European Patent Office, International Search Report and Written Opinion issued in International Application No. PCT/DK2013/050037 dated Nov. 7, 2013.

*Primary Examiner* — Mark A Laurenzi
*Assistant Examiner* — Paul W Thiede
(74) *Attorney, Agent, or Firm* — Wood Herron & Evans LLP

(57) ABSTRACT

A method of making a wind turbine blade incorporating a lightning protection system includes providing a blade mold; arranging a protruding element in the mold; arranging an electrically conductive layer over the protruding element; arranging one or more structural layers and/or structural components over the conductive layer; consolidating the layers under vacuum to form a blade shell having the conductive layer proximate an outer surface of the shell; separating the protruding element from the blade shell to define a recess with the conductive layer extending into the recess; providing an electrical component adjacent an inner surface of the shell; and electrically connecting the conductive layer to the component. An end portion of the connecting member is housed in the recess such that a surface of the connecting member abuts the conductive layer inside the recess.

26 Claims, 6 Drawing Sheets

(51) Int. Cl.
  *F03D 1/06* (2006.01)
  *B29D 99/00* (2010.01)
  *B29C 70/48* (2006.01)
  *F03D 80/30* (2016.01)
  *B29K 309/08* (2006.01)
  *B29L 31/08* (2006.01)

(52) U.S. Cl.
  CPC ....... *B29D 99/0025* (2013.01); *F03D 1/0675* (2013.01); *F03D 80/30* (2016.05); *B29K 2309/08* (2013.01); *B29L 2031/085* (2013.01); *F05B 2230/20* (2013.01); *F05B 2280/6003* (2013.01); *Y02E 10/721* (2013.01); *Y02P 70/523* (2015.11)

(58) Field of Classification Search
  CPC ........... B29L 2031/085; F03D 11/0033; F03D 1/0675; F03D 80/30; F05B 2230/20; F05B 2280/6003; Y02E 10/721; Y02P 70/523
  USPC .............................................. 416/39, 1, 230
  See application file for complete search history.

(56) References Cited

U.S. PATENT DOCUMENTS

| | | |
|---|---|---|
| 2010/0263898 A1 | 10/2010 | Hebert |
| 2011/0182731 A1 | 7/2011 | Naka et al. |
| 2012/0243992 A1* | 9/2012 | Grabau ................ F03D 1/0675 416/23 |

* cited by examiner

WIND TURBINE BLADE HAVING A LIGHTNING PROTECTION SYSTEM AND METHOD OF MAKING THE SAME

TECHNICAL FIELD

This invention relates to wind turbine blades that incorporate a lightning protection system, and to a method of making the same. The invention also extends to a pre-formed component for use in making the wind turbine blades, and a method of manufacturing the pre-formed component.

BACKGROUND

Lightning protection systems are typically integrated into wind turbine blades to address the problem of lightning strikes. An electrically conductive lightning receptor is arranged on or adjacent an outer surface of the blade to receive lightning that strikes the blade. Typically, the lightning receptor is electrically connected to a down cable that extends inside the blade. The lightning is discharged from the lightning receptor to the down cable and then to a ground potential via conductors that extend inside the blade, nacelle and tower of the wind turbine. Lightning protection systems therefore allow lightning to be discharged safely and minimise the risk of damage to the wind turbine from lightning strikes.

For example, US 2011/0182731 describes a wind turbine blade in which receptors extend through the blade shell such that they are exposed at the outer and inner surfaces of the blade shell. At the inner surface of the blade shell, the receptor is connected to a down cable. To increase the effectiveness of the lightning protection system, a conducting layer is laid over the outer surface of the blade shell and hence over the lightning receptors. The conducting layer increases the area of the blade that can receive lightning, thereby increasing the rate at which the receptors capture lightning strikes.

However, such wind turbine blades are cumbersome to manufacture because the conducting layer must be added to the blade after the blade shell has been manufactured, which requires an extra, time-consuming step in the manufacturing process. Furthermore, ridges or other such discontinuities of the outer blade surface in the region of the lightning receptors can adversely affect the aerodynamic design of the blade, leading to reduced aerodynamic efficiency.

It is an object of the invention to mitigate or overcome these problems.

SUMMARY OF THE INVENTION

Against this background, and from a first aspect, the invention resides in a method of making a wind turbine blade incorporating a lightning protection system, the method comprising: providing a wind turbine blade mould; arranging a protruding element in the mould; arranging an electrically conductive layer over the protruding element in the mould; arranging one or more structural layers and/or structural components over the electrically conductive layer; consolidating the layers under vacuum to form a blade shell having an integrated electrically conductive layer proximate an outer surface of the shell; separating the protruding element from the blade shell to define a recess in the outer surface of the shell, with the electrically conductive layer extending into the recess; providing an electrical component of the lightning protection system adjacent an inner surface of the shell; and electrically connecting the electrically conductive layer to the electrical component via a connecting member; wherein an end portion of the connecting member is housed in the recess such that a surface of the connecting member abuts the electrically conductive layer across an interface region inside the recess, and such that the end portion does not substantially protrude from the outer surface of the shell.

In this way, the invention provides a method of forming a wind turbine blade incorporating a lightning protection system such that the connecting element is housed in the recess and does not protrude substantially from the outer surface of the blade. Thus, the connecting element does not adversely affect the aerodynamic performance of the blade, which ensures efficient generation of electricity.

In a preferred embodiment, the protruding element and electrically conductive layer are provided together as a pre-formed component and are arranged in the mould simultaneously. This provides a fast and efficient method of arranging the components in the mould.

So that the end portion of the protruding element may fit tightly into the recess, the protruding element may have substantially the same shape and dimensions as the end portion of the connecting element.

The interface region may comprise a base of the recess. This maximises the surface area of the interface region, improving electrical contact between the connecting element and the electrically conductive layer.

The method may further comprise forming an aperture through the blade shell in the base of the recess, and arranging the connecting member such that it extends through the aperture. In this way, a remaining portion of the connecting member can be housed in the aperture, to facilitate contact between the connecting member and the electrical component.

In one embodiment, the protruding element includes a protruding detail formation, the detail formation providing a corresponding indentation in the base of the recess, and the method comprises forming the aperture at the indentation. The detail formation facilitates the step of forming the aperture, thereby improving efficiency of the method.

To further improve the electrical contact at the interface region, the method may optionally comprise sealing between a portion of the electrically conductive layer and a surface of the protruding element to prevent contamination of the electrically conductive layer in the interface region.

The sealing step may comprise disposing a protective layer between the electrically conductive layer and the surface of the protruding element. In this case, the protruding element, electrically conductive layer and protective layer may be provided together as a pre-formed component such that they are arranged in the mould simultaneously.

To adhere the protective layer to the electrically conductive layer, the protective layer may be an adhesive layer. In this way, the protective layer may also serve to adhere the electrically conductive layer to the protruding element. In embodiments that include a protective layer, the method may further comprise removing the protective layer from the electrically conductive layer before arranging the connecting member in the recess.

Alternatively or additionally to the protective layer, the protruding element may be at least partially formed from a resilient material, and the sealing step may comprise deforming the protruding element to form a seal between the electrically conductive layer and the surface of the protruding element.

In preferred embodiments, the electrically conductive layer is a lightning receptor, which is optionally a foil or a mesh so as to further minimise disruption to the aerodynamic form of the blade.

Preferably, the electrical component comprises a connector block for coupling the electrically conductive layer to an electrically conducting cable inside the blade.

Optionally, the step of consolidating the layers under vacuum includes a resin infusion process. In an alternative embodiment, pre-preg layers may be used, in which case the resin infusion process may be omitted. Preferably, the step of consolidating the layers under vacuum includes a curing process.

The invention also resides in a wind turbine blade incorporating a lightning protection system. The wind turbine blade comprises a blade shell having an inner surface and an outer surface; an integrated electrically conductive layer proximate the outer surface of the blade shell; an electrical component arranged adjacent the inner surface of the blade shell; and at least one connecting member electrically connecting the electrically conductive layer to the electrical component through the blade shell. The outer surface of the blade shell is provided with a moulded recess, the electrically conductive layer extending at least partially into said recess, and an end portion of the connecting member is housed in the recess such that a surface of the connecting member abuts the electrically conductive layer across an interface region inside the recess, and such that the end portion does not substantially protrude from the outer surface of the shell.

Preferably, the interface region comprises a base of the recess. This maximises the surface area of the interface region, improving electrical contact between the connecting element and the electrically conductive layer.

Preferably, a portion of the connecting member is arranged outboard of at least a portion of the electrically conductive layer relative to the inside of the wind turbine blade.

In preferred embodiments, the electrically conductive layer is a lightning receptor, which is optionally a foil or a mesh so as to further minimise disruption to the aerodynamic form of the blade.

To provide a high electrical conductivity while reducing cost, the electrically conductive layer is preferably made from aluminium. However, it will be appreciated that the electrically conductive layer may otherwise be made from copper or another suitable conductive material In preferred embodiments, the electrical component comprises a connector block for coupling the electrically conductive layer to an electrically conducting cable inside the blade.

The invention also extends to a wind turbine comprising the wind turbine blade as described above, or a wind turbine blade made in accordance with any method described above, and to a wind farm comprising a plurality of such wind turbines.

From another aspect, the invention resides in a pre-formed component for use in making a wind turbine according to the method described above, the pre-formed component comprising an electrically conductive layer and at least one protruding element, wherein a portion of the electrically conductive layer is shaped around the protruding element to define a recess in the electrically conductive layer, the recess comprising a base and a surface of the electrically conductive layer being sealed or sealable to the base.

To provide multiple recesses such that the electrically conductive layer may receive multiple connecting elements, the component may comprise a plurality of protruding elements and the electrically conducting layer may comprise a plurality of recesses, each being shaped around a respective protruding element.

To protect the base surface from contamination during the moulding process, a protective layer may be provided between the electrically conductive layer and the protruding element.

In one embodiment, the protruding element is at least partially formed from a resilient material, and the electrically conducting layer is sealed or sealable to the base surface by deforming the protruding element during a vacuum-assisted moulding process. In this way, the protruding element protects the base surface from contamination during the moulding process.

So that the end portion of the protruding element may fit tightly into the recess, the protruding element may have substantially the same shape and dimensions as an end portion of a connecting element, such as a head of a bolt. In a preferred embodiment, the protruding element is of substantially the shape and dimensions of a bolt head.

Optionally, a surface of the protruding element may include a protruding detail formation for forming an indent in the blade surface. The indent may indicate a position for drilling an aperture to increase efficiency of the manufacturing process.

The invention further extends to a method of forming the pre-formed component described above, the method comprising: providing a forming tool comprising a female element and a male element, the male element being of substantially the same shape and dimensions as a protruding element of the pre-formed component, arranging an electrically conductive layer of the pre-formed component between the male and female elements, pressing the male and female elements together so as to form a recess in the conductive layer, and removing the female element from the conductive layer.

Preferably, the male forming element defines the protruding element of the pre-formed component. In this way, the male forming element may remain in the recess after fabrication of the pre-formed component.

In an alternative embodiment, the method may comprise replacing the male forming element with a protruding element of the pre-formed component. In this way, a male forming element with properties suitable for moulding the recess may be selected for use in forming the pre-formed component, and a protruding element with properties suitable for protecting an interface region of the electrically conductive layer may be selected for use in forming the wind turbine blade.

The method may further comprise sealing the protruding element to the conductive layer, so as to protect the conductive layer from contamination.

Optionally, the method may further comprise arranging a protective layer between the male element and the conductive layer.

BRIEF DESCRIPTION OF THE DRAWINGS

In order that the invention may be more readily understood, specific embodiments of the invention will now be described, by way of example only, with reference to the following drawings in which.

DETAILED DESCRIPTION

Figure 1A:
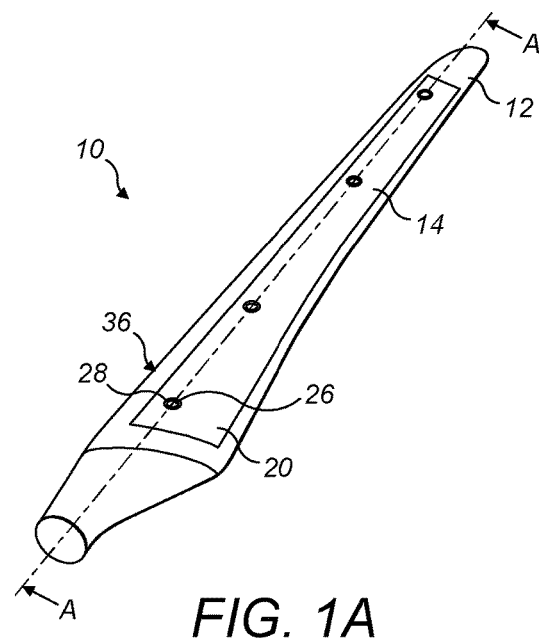
FIG. 1A is a perspective view of a wind turbine blade according to the invention.

FIG. 1A illustrates a wind turbine blade 10 that incorporates a lightning protection system. The blade comprises a blade shell 12 formed from two half shells. The half shells are typically moulded from glass-fibre reinforced plastic (GRP), comprising glass fibres embedded in a cured resin matrix. The blade shell 12 has an outer surface 14 that is exposed to the blade surroundings, and an inner surface 16 (shown in FIG. 1B) that faces an internal cavity 18 of the blade 10.

Figure 1B:
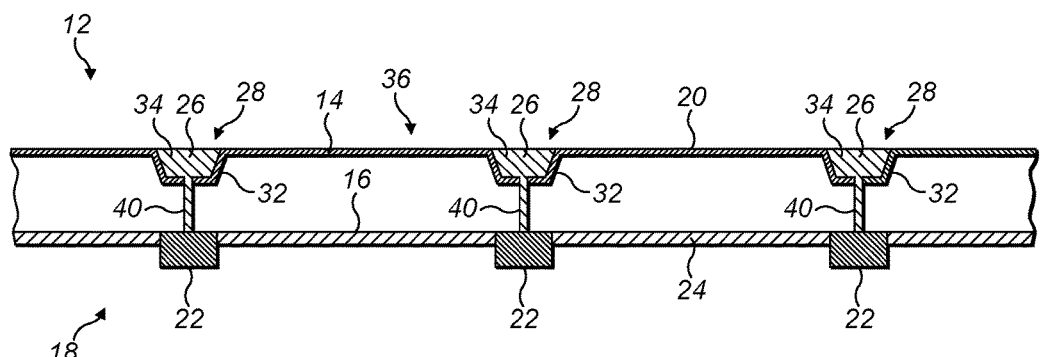
FIG. 1B is a cross-sectional view of part of the wind turbine blade of FIG. 1, taken along the line A-A of FIG. 1A.
Figure 1C:
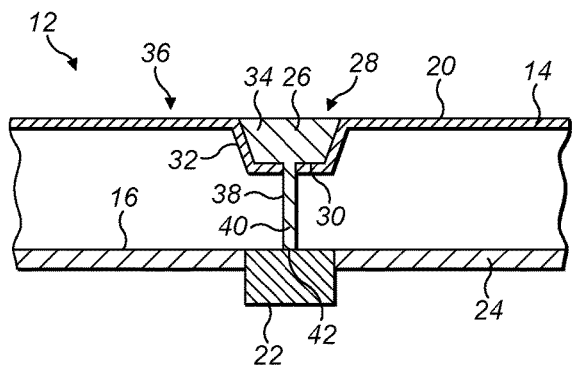
FIG. 1C is a partial cross-sectional view of FIG. 1B.

Referring also to FIG. 1B, the lightning protection system of the wind turbine blade 10 comprises an electrically conductive layer 20 that acts as a lightning receptor, an electrical component 22 in the form of a connector block, an electrically conducting cable 24 connected to the connector block 22 that acts as a down cable, and a connecting element 26 that electrically connects the electrically conductive layer 20 to the connector block 22.

The electrically conductive layer 20 is a metallic mesh or, as in the embodiment illustrated, a metallic foil made from a metal such as copper or aluminium. The foil 20 lies proximate, and is integrated with, the outer surface 14 of the blade shell 12. Specifically, the foil 20 is integrated with the cured resin matrix comprising the blade shell 12. In this way, the electrically conductive layer 20 does not disrupt the aerodynamic form of the blade shell 12.

The outer surface 14 of the blade shell 12 is provided with a plurality of recesses 28. As best illustrated in FIG. 10, each recess 28 comprises a base surface 30 and a peripheral wall 32 that extends outwardly away from the base surface 30 towards the outer surface 14 of the shell 12. The electrically conductive layer 20 extends across the outer surface 14 of the blade shell 12 and into the recess 28. In this way, the electrically conductive layer 20 is integrated with the base surface 30 and peripheral wall 32 of the recess 28.

Each recess 28 houses an end portion 34 of a connecting element. In the embodiment described, the connecting element 26 is a metallic bolt and the end portion 34 is a bolt head such that the recess 28 houses the bolt head 34. As best seen in FIGS. 1A and 1B, each recess 28 is of substantially the same shape and dimensions as the bolt head 34. The bolt head 34 is therefore fully accommodated in the recess 28, and does not protrude substantially beyond an outer surface 36 of the blade 10. Specifically, the bolt head 34 lies flush with the outer surface 36 of the blade 10 such that it does not disrupt the aerodynamic form of the blade 10.

At the base 30 of the recess 28, the electrically conductive layer 20 is in electrical contact with the bolt head 34. The base 30 of the recess 28 therefore defines an interface region between the bolt head 34 and the electrically conductive layer 20 at which electrical contact occurs.

As shown in FIG. 10, in the base 30 of the recess 28, an aperture 38 is provided in the blade shell 12 and the electrically conductive layer 20. The aperture 38 extends through the thickness of the blade shell 12 such that the aperture 38 is open at both the base surface 30 of the recess 28 and the inner surface 16 of the blade shell 12. The remaining portion of the connecting element 40 (i.e. the shaft of the bolt) is housed in the aperture 38. In this way, the connecting element 26 extends through the aperture 38 from the recess 28 to the inner surface 16 of the blade shell 12.

Inside the blade 10, and opposite the recess 28 in the outer surface 14 of the blade shell 12, the connector block 22 is mounted to the inner surface 16 of the blade shell 12 by suitable means, such as an adhesive, and the conducting cable 24 is connected to the connector block 22. The connector block 22 is arranged in contact with an inner end 42 of the connecting element 26 (i.e. with the end 42 of the shaft 40 of the bolt 26). In this way an electrically conducting path is formed that runs from the electrically conductive layer 20, into the connecting element 26 via the interface region 30, to the connector block 22 and into the electrically conducting cable 24.

When the wind turbine blade 10 is in use, lightning that strikes the blade 10 is received by the electrically conductive layer 20. The current is conducted to the connecting element 26 through the conducting interface 30 between the electrically conductive layer 20 and the connecting element 26, which is disposed in the recess 28. The connecting element 26 conducts the current through the blade shell 12 to the connector block 22. The current is then conducted to the electrically conducting cable 24, and then to conductors in the nacelle and tower, which direct it to a ground potential.

Because the bolt head 34 of the connecting element 26 is housed in the recess 28, and does not protrude substantially from the outer surface 36 of the blade 10, the connecting element 26 does not adversely affect the aerodynamic performance of the blade 10.

A method of making the wind turbine blade 10 described above will now be described with reference to FIGS. 2A to 2H. As illustrated schematically in FIG. 2A, a wind turbine blade mould 44 is firstly provided. The blade mould 44 is typically provided as two mould halves, in which two half shells are formed, each mould half comprising a moulding surface 46. Once the half shells have been formed, the two mould halves are brought together and the half shells are joined to form the blade shell 12.

Figure 2A:
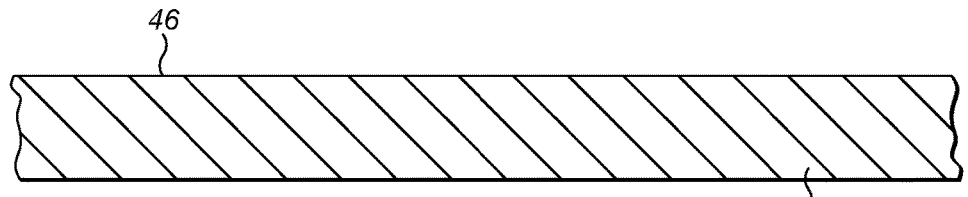
FIGS. 2A to 2H illustrate a method of making a structural shell of the wind turbine blade of FIGS. 1A to 10.
Figure 2B:
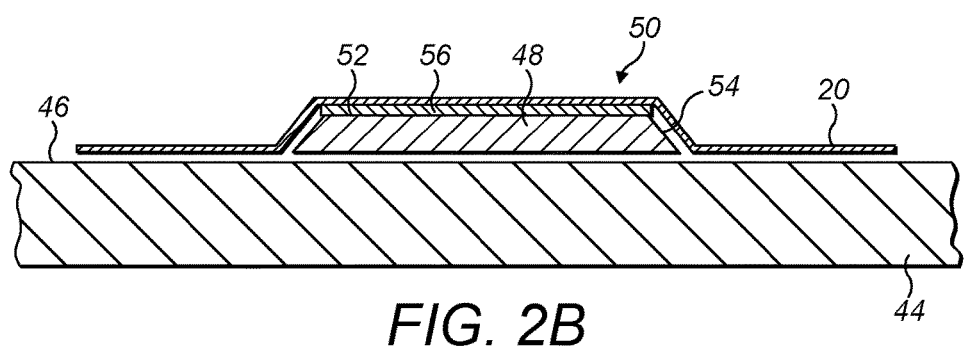
Figure 3A:
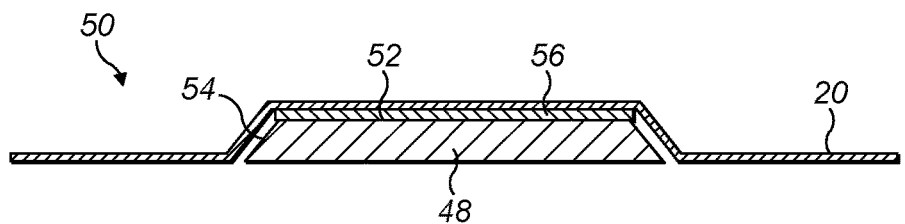
FIGS. 3A and 3B are plan views of pre-formed components for use in making a wind turbine blade according to the method illustrated in FIG. 2A to 2H.

As illustrated in FIG. 2B, a protruding element 48 and an electrically conductive layer 20, provided together in the form of a pre-formed component 50 as illustrated in FIG. 3A, are arranged in the blade mould 44 on the moulding surface 46. Each pre-formed component 50 comprises an electrically conducting layer 20 and at least one protruding element 48. The protruding element 48 is of the shape and dimensions of the desired recess 28 in the blade shell, and hence comprises a surface 52 that corresponds to the base surface 30 of the recess 28, and a peripheral wall 54 that corresponds to the peripheral wall 32 of the recess 28. Specifically, the protruding element 48 has substantially the same shape and dimensions as the bolt head 34 that will be accommodated in the recess 28 when the blade 10 is fully assembled.

The majority of the electrically conductive layer 20 is of substantially planar configuration. However, a portion of the electrically conductive layer 20 is shaped around the protruding element 48, specifically around its surface 52 and peripheral wall 54, such that that portion of the electrically conductive layer 20 takes the form of the protruding element 48. A protective layer 56 is disposed between the electrically conductive layer 20 and the surface 52 of the protruding element 48, such that the protective layer 56 covers the portion of the electrically conductive layer 20 that forms the interface region 30. The protective layer 56 has adhesive on both sides so that it adheres the electrically conductive layer 20 to the protruding element 48. In this way, the protective layer 56 protects the interface region 30 from contamination during the moulding process. Specifically, it prevents resin infiltrating into the interface region 30 between the electrically conductive layer 20 and the protruding element 48.

Figure 2C:
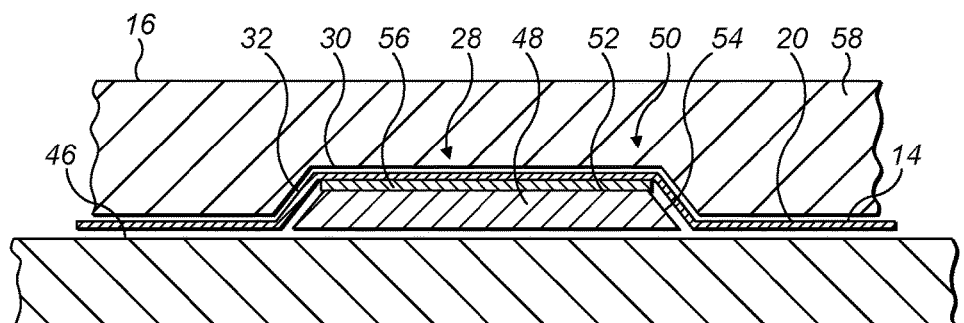

Once the pre-formed components 50 have been arranged in the mould 44, each half shell is 'laid up' by arranging various laminate layers 58 of the half shells in the respective mould halves over the pre-formed components 50, as illustrated in FIG. 2C.

A layer of dry fibrous material is placed on the inner mould surface 46 over the pre-formed component 50. Following a resin infusion process, this layer ultimately forms the outer skin of the blade 10. The fibrous layer is arranged in continuous contact with the electrically conductive layer 20, such that the outer skin is moulded to the shape of the electrically conductive layer 20, and is hence shaped around the protruding element 48.

A layer of structural foam is introduced into the mould half on top of the fibrous layer, and a further layer of dry fibrous material is placed on the upper surface of the structural foam. Following the resin infusion process, this layer ultimately forms the inner skin of the blade 10. Further components such as spar caps may also be incorporated into the blade shell 12, between the fibrous layers.

The components are covered with an airtight bag to form a sealed region that encapsulates all of the components. The sealed region is then evacuated using a vacuum pump. A supply of liquid resin is connected to the sealed region, and resin flows into the sealed region through a plurality of resin inlets, which are longitudinally spaced along the mould half. Resin infuses throughout the lay-up in a generally chordwise direction, between the components in the half shell. Resin also infuses between the outer fibrous layer and the electrically conductive layer 20, such that the resin and the outer fibrous layer are moulded around the electrically conductive layer 20.

The pump continues to operate during a subsequent curing operation in which the mould assembly is heated so as to cure the resin, although during the curing process the vacuum pressure may be adjusted. The bags are then removed from the moulded half shells.

Because the structural components 58 of the blade shell 12 are laid up around the pre-formed-component 50, the electrically conductive layer 20 is effectively embedded into the outer skin as the resin is cured, and is therefore situated proximal to the outer surface 14 of the blade shell 12. The outer surface 14 of the blade shell 12 adopts the shape of the electrically conductive layer 20, which is shaped around the protruding element 48. Thus, the protruding element 48 confers a recess 28 in the outer surface 14 of the blade shell 12, which, during the moulding process, houses the protruding element 48.

During the resin infusion process, the protective layer 56 arranged between the electrically conductive layer 20 and the protruding element 48 protects the portion of the electrically conductive layer 20 that forms the interface region 30 from the infusing resin. The portion that is covered by the protective layer 56 is therefore substantially free from resin.

Figure 2D:
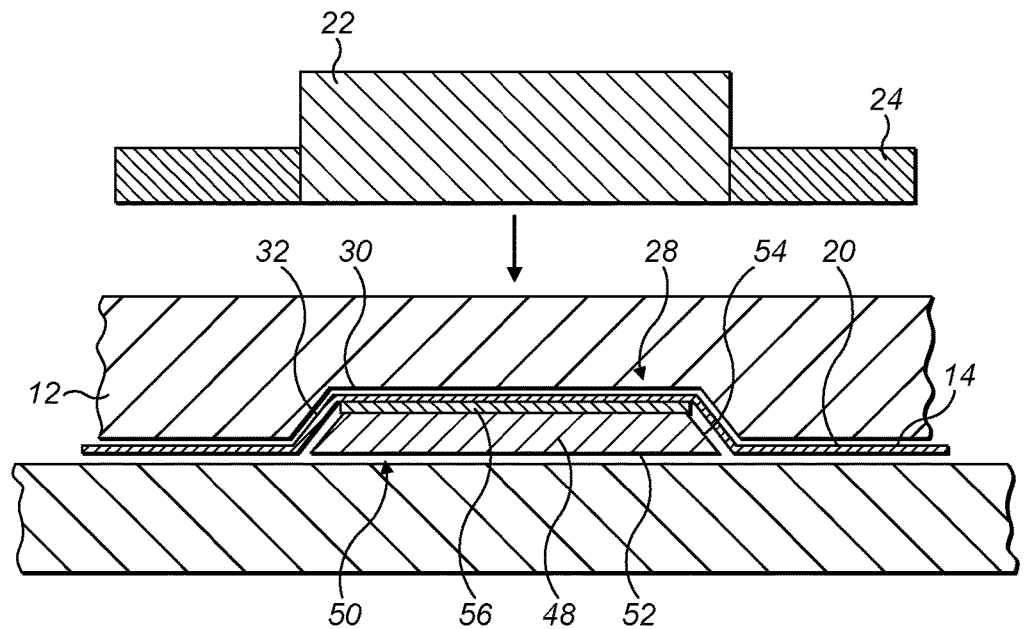

After the curing process, and as illustrated in FIG. 2D, the connector block 22 and conductive cable 24 are fitted to the inner surface 16 of the blade shell 12, at a position opposite the protruding element 48. The connector block 22 and conductive cable 24 are attached to the inner surface 16 by adhesive.

Figure 2E:
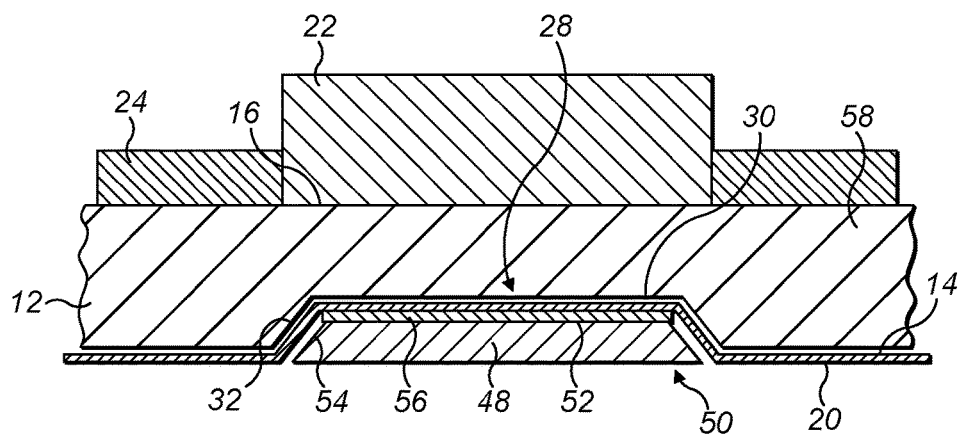

The two half shells are then brought together by closing the mould 44. One of the mould halves is lifted, upturned, and pivoted into position above the other mould half. The half shells are joined together by an adhesive, and the blade shell 12 is removed from the mould 44, as illustrated in FIG. 2E. If resin has infused between the mould 44 and the pre-formed component 50 during the resin infusion process, this resin, once cured, may hold the pre-formed component 50 in place as the blade shell 12 is removed from the mould 44. Hence, when the blade shell 12 is removed from the mould 44, the pre-formed component 50 may initially remain housed in the recess 28.

Figure 2F:
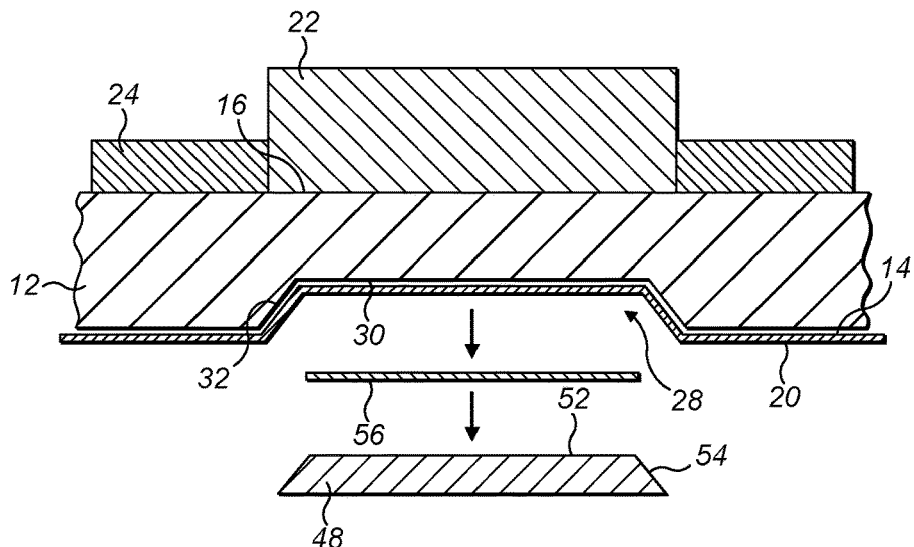

In the next stage, the protruding element 48 is removed from the recess 28, as shown in FIG. 2F, for example by means of a hand tool such as a chisel, or by abrasive means such as grinding or sanding. If cured resin is present around the protruding element 48 this may hinder removal of the protruding element 48, and any such cured resin may therefore be removed, for example by grinding or sanding. The protective layer 56 is also removed from the base surface 30 for example by peeling or scraping, to expose the interface region that is substantially free from resin.

Figure 2G:
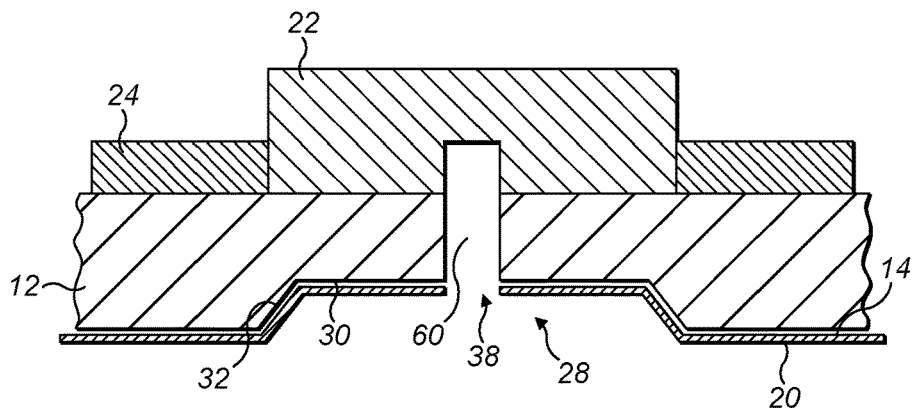

Next, as shown in FIG. 2G, the aperture 38 is drilled into the base 30 of the recess 28 at its central point. The aperture 38 is of a sufficient width to house the remaining portion 40 of the connecting member 26 (i.e. the shaft of the bolt). An inner wall 60 of the aperture 38 is tapped to provide a female screw thread that receives a male screw thread on the shaft 40 of the bolt 26.

Figure 2H:
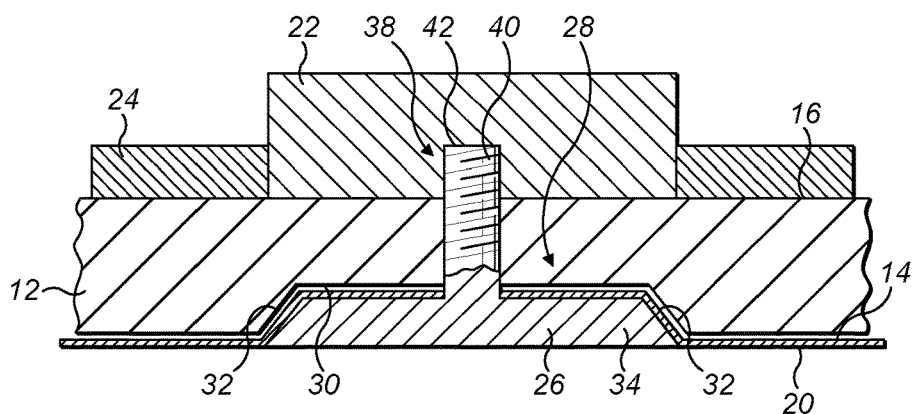

Finally, as shown in FIG. 2H, the bolt 26 is inserted into the recess 28 and through the aperture 38, where it is held in place by the cooperative screw threads. The bolt head 34 is housed in the recess 28, and is in electrical contact with the electrically conductive layer 20 in the recess 28 at the interface region 30. The interface region 30 is substantially free from resin as has been described above, such that electrical contact between the bolt head 34 and the electrically conductive layer 20 is achieved cleanly across the interface region 30.

A method of forming the pre-formed component 50 above will now be described with reference to FIGS. 4A to 4C. According to the method, the protruding element 48 acts as a male forming element that is co-operable with a female forming element 62 to shape the electrically conductive layer 20.

Figure 4A:
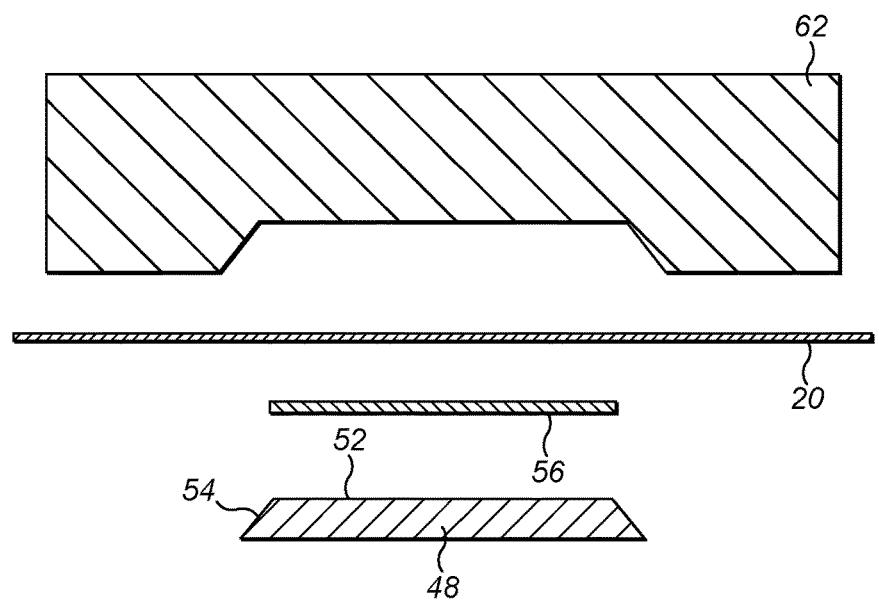
FIGS. 4A to 4C illustrate a method of making the pre-formed component of FIG. 3A.
Figure 4B:
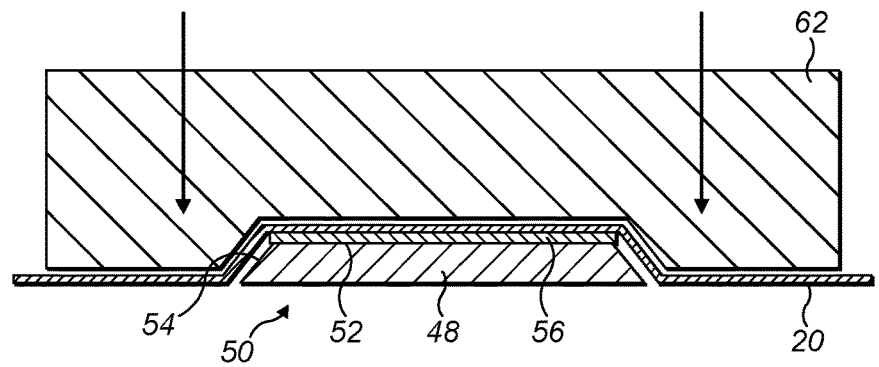
Figure 4C:
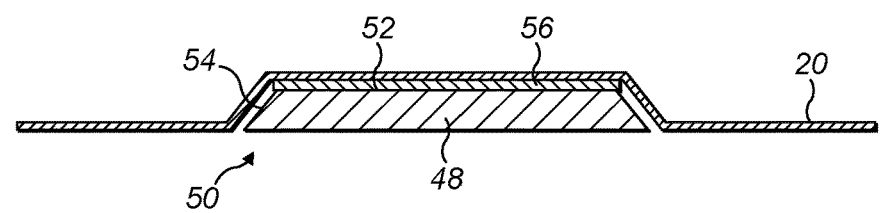

To form the pre-formed component 50, an electrically conductive layer 20 is arranged between the protruding element 48 and the female forming element 62, and an adhesive protective layer 56, such as a plastics film coated with an adhesive layer, is also arranged between the electrically conductive layer 20 and the protruding element 48, as shown in FIG. 4A. The forming elements 48, 62 are moved together such that the protruding element 48 is received in the female forming element 62, as shown in FIG. 4B. The electrically conductive layer 20 is deformed and shaped around the protruding element 48, and the adhesive protective layer 56 adheres the electrically conductive layer 20 to the protruding element 48. The female forming element 62 is then removed, as shown in FIG. 4C, to leave the pre-formed component 50.

Figure 3B:
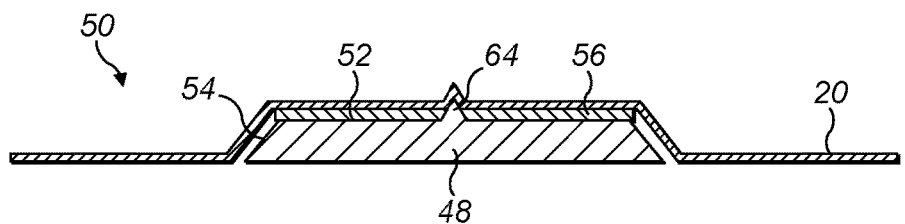

In an alternative embodiment of the pre-formed component 50, illustrated in FIG. 3B, the protruding element 48 is provided with a protruding detail formation 64 on its surface 52. The protruding detail formation 64 confers a corresponding detail on the base surface 30 of the recess 28 during the moulding process described above. In the embodiment shown the detail formation 64 is arranged at the centre of the protruding element 48, and therefore confers a detail at the centre of the base surface 30 of the recess 28. The location of the detail indicates the point at which the aperture 38 should be drilled.

In a further alternative embodiment of the pre-formed component or of the method, the protection of the interface region of the electrically conductive layer is not provided by the protective layer, but is instead provided by the protruding element itself. The protruding element may be made from a resilient material, or may be coated with a layer of a resilient material such as a silicon rubber. When the protruding element is placed under vacuum pressure during the moulding process, the resilient material of the protruding element is deformed. Specifically, the protruding element is compressed. In this way, the protruding element seals against the electrically conductive layer, thereby preventing resin from infiltrating into this region.

In this embodiment, a first protruding element made from a substantially non-deformable material may be used as the forming element to form the pre-formed component. Before the pre-formed component is inserted in the mould, the non-deformable protruding element may be replaced with a deformable protruding element made from a resilient material. The protective layer may be dispensed with, or it may still be included, for example to adhere the protruding element to the electrically conductive layer, thus further preventing contamination of the interface region.

Many modifications may be made to the embodiments described above without departing from the scope of the invention as defined in the following claims.

For example, in the embodiment described, the blade shell 12 is made using a dry fibre cloth, and resin is infused into the cloth during the moulding process. In an alternative embodiment, pre-preg materials may be used instead, and the resin infusion step may be omitted.

The connecting element need not be a bolt but may take any suitable form, and the recess may be any shape that is suitable for housing an end portion of the connecting element. Although in the embodiments described above the connecting element 26 lies flush with the blade surface, it will be appreciated that the connecting element may protrude slightly from the blade surface, or may lie inwardly of the blade surface, but it is preferably arranged such that it does not adversely affect the aerodynamic properties of the blade.

The electrically conductive layer may be made from any electrically conducting material, and need not be a mesh or foil, but may take any suitable form. The electrically conductive layer need not necessarily be the outermost layer of the blade shell. Typically, further layers such as a gel coat layer and/or a print layer may be applied on top of the electrically conductive layer.

The invention claimed is:

1. A method of making a wind turbine blade incorporating a lightning protection system, the method comprising:
    providing a wind turbine blade mould;
    arranging a protruding element in the mould;
    arranging an electrically conductive layer over the protruding element in the mould;
    arranging one or more structural layers and/or structural components over the electrically conductive layer;
    consolidating the layers under vacuum to form a blade shell having an integrated electrically conductive layer proximate an outer surface of the shell;
    separating the protruding element from the blade shell to define a recess in the outer surface of the shell, with the electrically conductive layer extending into the recess;
    providing an electrical component of the lightning protection system adjacent an inner surface of the shell; and
    electrically connecting the electrically conductive layer to the electrical component via a connecting member;
    wherein an end portion of the connecting member is housed in the recess such that a surface of the connecting member abuts the electrically conductive layer across an interface region inside the recess, and such that the end portion does not substantially protrude from the outer surface of the shell.

2. The method of claim 1, wherein the protruding element and electrically conductive layer are provided together as a pre-formed component and are arranged in the mould simultaneously.

3. The method of claim 1, wherein the protruding element has substantially the same shape and dimensions as the end portion of the connecting element.

4. The method of claim 1, wherein the interface region comprises a base of the recess.

5. The method of claim 4, wherein the method further comprises forming an aperture through the blade shell in the base of the recess, and arranging the connecting member such that it extends through the aperture.

6. The method of claim 5, wherein the protruding element includes a protruding detail formation, the detail formation providing a corresponding indentation in the base of the recess, and the method comprises forming the aperture at the indentation.

7. The method of claim 1, wherein the method comprises sealing between a portion of the electrically conductive layer and a surface of the protruding element to prevent contamination of the electrically conductive layer in the interface region.

8. The method of claim 7, wherein the protruding element is at least partially formed from a resilient material, and the sealing step comprises deforming the protruding element to form a seal between the electrically conductive layer and the surface of the protruding element.

9. The method of claim 7, wherein the sealing step comprises disposing a protective layer between the electrically conductive layer and the surface of the protruding element.

10. The method of claim 9, wherein the protruding element, electrically conductive layer and protective layer are provided together as a pre-formed component and are arranged in the mould simultaneously.

11. The method of claim 9, wherein the protective layer is an adhesive layer.

12. The method of claim 9, wherein the method further comprises removing the protective layer from the electrically conductive layer before arranging the connecting member in the recess.

13. The method of claim 1, wherein the electrically conductive layer is a lightning receptor.

14. The method of claim 1, wherein the electrically conductive layer is a foil or a mesh.

15. The method of claim 1, wherein the electrical component comprises a connector block for coupling the electrically conductive layer to an electrically conducting cable inside the blade.

16. The method of claim 1, wherein the step of consolidating the layers under vacuum includes a resin infusion process.

17. The method of claim 1, wherein the step of consolidating the layers under vacuum includes a curing process.

18. A wind turbine blade incorporating a lightning protection system, the wind turbine blade comprising:
- a blade shell having an inner surface and an outer surface, wherein the outer surface of the blade shell is provided with a moulded recess defined by a base surface and a peripheral wall that extends outwardly toward the outer surface;
- an integrated electrically conductive layer proximate the outer surface of the blade shell, wherein the electrically conductive layer extends at least partially into the recess to form at least part of the base surface;
- an electrical component arranged adjacent the inner surface of the blade shell; and
- at least one connecting member electrically connecting the electrically conductive layer to the electrical component through the blade shell;
- wherein an end portion of the at least one connecting member is housed in the recess and includes an inner surface, an outer surface generally parallel to the inner surface, and a side surface extending therebetween, wherein the inner surface of the at least one connecting member abuts the electrically conductive layer across an interface region along the base surface of the recess, and wherein the outer surface of the at least one connecting member does not substantially protrude from the outer surface of the shell.

19. The wind turbine blade of claim 18, wherein the interface region comprises a base portion of the recess.

20. The wind turbine blade of claim 18, wherein at least a portion of the connecting member is arranged outboard of at least a portion of the electrically conductive layer relative to the inside of the wind turbine blade.

21. The wind turbine blade of claim 18, wherein the electrically conductive layer is a lightning receptor.

22. The wind turbine blade of claim 21, wherein the electrically conductive layer is made from aluminum.

23. The wind turbine blade of claim 22, wherein the electrical component comprises a connector block for coupling the electrically conductive layer to an electrically conducting cable inside the wind turbine blade.

24. The wind turbine blade of claim 21, wherein the electrically conductive layer is a foil or a mesh.

25. A wind turbine comprising the wind turbine blade of claim 18.

26. A wind farm comprising a plurality of wind turbines, each of the plurality of wind turbines being the wind turbine of claim 25.

* * * * *